(12) United States Patent
Jamin et al.

(10) Patent No.: US 9,621,206 B2
(45) Date of Patent: Apr. 11, 2017

(54) RF RECEIVER

(71) Applicant: NXP B.V., Eindhoven (NL)

(72) Inventors: Olivier Jamin, Caen (FR); Fabien Lefebvre, Caen (FR); Gilles Seferian, Caen (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/803,225

(22) Filed: Jul. 20, 2015

(65) Prior Publication Data

US 2016/0028424 A1 Jan. 28, 2016

(30) Foreign Application Priority Data

Jul. 24, 2014 (EP) .................................... 14290216

(51) Int. Cl.
*H04B 1/10* (2006.01)
*H04B 1/00* (2006.01)

(52) U.S. Cl.
CPC ........... *H04B 1/1018* (2013.01); *H04B 1/001* (2013.01); *H04B 1/0014* (2013.01); *H04B 1/0017* (2013.01)

(58) Field of Classification Search
CPC . H04B 1/10; H04B 1/12; H04B 1/123; H04B 1/16; H04B 1/30; H04B 1/1018; H04B 1/001; H04B 1/0014; H04B 1/0017
See application file for complete search history.

(56) References Cited

U.S. PATENT DOCUMENTS

| 8,401,116 | B2 | 3/2013 | Jamin et al. | |
|---|---|---|---|---|
| 8,913,975 | B2 | 12/2014 | Deforeit et al. | |
| 2007/0081617 | A1* | 4/2007 | Fudge | H04B 1/0003 375/350 |
| 2008/0169871 | A1* | 7/2008 | Joet | H04B 1/16 327/551 |
| 2009/0086806 | A1 | 4/2009 | Hwang et al. | |
| 2010/0174768 | A1 | 7/2010 | Janssen | |
| 2010/0253558 | A1 | 10/2010 | Chen et al. | |
| 2011/0150069 | A1 | 6/2011 | Jamin et al. | |

FOREIGN PATENT DOCUMENTS

EP 2 713 522 A1 4/2014

OTHER PUBLICATIONS

Extended European Search Report for Application No. 14290216.2 (Feb. 23, 2015).

* cited by examiner

*Primary Examiner* — Nguyen Vo

(57) ABSTRACT

An RF receiver comprising: an RF signal processing unit for receiving an RF signal, wherein the RF signal processing unit comprises a dynamically reconfigurable RF filter for filtering the RF signal; an analog-to-digital converter for converting the filtered RF signal to a digital signal; and a digital signal processing unit for processing the digital signal to provide at least one channel; wherein the digital signal processing unit is adapted to adjust a respective transfer function of at least one said channel when the RF filter is reconfigured, to at least partially compensate a change in the transfer function of the RF filter.

19 Claims, 5 Drawing Sheets

RF RECEIVER

CROSS-REFERENCE TO RELATED APPLICATIONS

This application claims the priority under 35 U.S.C. §119 of European patent application no. 14290216.2, filed Jul. 24, 2014 the contents of which are incorporated by reference herein.

The present invention relates to an RF receiver, and relates particularly, but not exclusively, to an RF receiver having a dynamically reconfigurable RF signal processing unit.

Communication systems handling high data rates typically require the use of multiple parallel receivers or a single wideband receiver.

FIG. 1 shows a single-channel receiver bank comprising multiple single-channel receivers for each respective channel to be concurrently received. This approach leads to high costs and high power consumption.

Once the useful parts of the spectrum occupy a moderate portion of the total input spectrum, the use of a single direct RF digitization receiver (FIG. 2) has been shown to be more efficient in terms of power and cost than the conventional approach using multiple single-channel receivers (FIG. 1).

FIG. 2 illustrates a direct RF digitization receiver, comprising an RF signal processing unit (RSPU) 10, also known as RF front end, an analog-to-digital converter (ADC) 30 and a digital signal processing unit (DSPU) 40. The RF signal 4 input to the RSPU 10 may comprise a number of wanted channels 6 selected from a number of available channels in a given bandwidth. The ADC 30 may be used to convert the whole input spectrum to a digital signal 32, allowing selection of individual channels 42 to be carried out in the digital domain.

The RF performance of a direct RF digitization receiver may be strongly limited by the dynamic range of the ADC. The use of a programmable RF filter in the RSPU to compensate for an uneven amplitude distribution in the input RF signal can relax the dynamic range requirements of the ADC. U.S. Pat. No. 8,401,116 describes the use of a programmable RF filter in an RF receiver for compensating a tilt (e.g. a high-frequency roll-off) in the amplitude of an input RF signal.

While this approach can optimize performance of the receiver under static conditions, it fails when the communication channel has a dynamic behavior. This is because reconfiguration of the RSPU, in particular the RF filter, causes a transient amplitude step which hampers the baseband demodulator and causes uncorrectable errors in the transmission, especially for high-order modulations (e.g. 256 QAM and above).

Preferred embodiments of the present invention seek to overcome one or more disadvantages of the prior art.

According to the present invention, there is provided an RF receiver comprising:

an RF signal processing unit for receiving an RF signal, wherein the RF signal processing unit comprises a dynamically reconfigurable RF filter for filtering the RF signal;

an analog-to-digital converter for converting the filtered RF signal to a digital signal; and a digital signal processing unit for processing the digital signal to provide at least one channel;

wherein the digital signal processing unit is adapted to adjust a respective transfer function of at least one said channel when the RF filter is reconfigured, to at least partially compensate a change in the transfer function of the RF filter.

By adjusting the respective transfer function of at least one said channel when the RF filter is reconfigured, to at least partially compensate a change in the transfer function of the RF filter, the present invention reduces or avoids a significant change in signal amplitude at each channel. It is therefore possible to dynamically reconfigure the RSPU depending on the input spectrum conditions, while avoiding or reducing any adverse impact of such a reconfiguration. This enables optimum signal conditioning in the RSPU which, in turn, maximizes the full receiver RF performance (e.g. signal-to-noise ratio, signal-to-noise and distortion ratio, bit error rate, modulation error ratio), even for strongly time-varying communication channels.

The digital signal processing unit (DSPU) may be adapted to incrementally adjust the respective transfer function of said at least one channel to its previous value following reconfiguration of the RF filter.

In this way, the signal amplitude at the channel may be changed in steps sufficiently small to be transparent to the baseband demodulator.

In one embodiment, the RF receiver may further comprise a control part adapted to provide: a first control signal for triggering reconfiguration of the RF filter; and a second control signal, synchronized with said first control signal, for controlling said digital signal processing unit to adjust said respective transfer function of said at least one channel simultaneously with the reconfiguration of the RF filter.

This enables synchronization between the RF signal processing unit and the digital signal processing unit, which may be implemented as separate integrated circuits. The second control signal may be generated in the RF signal processing unit.

The digital signal processing unit may be configured to adjust the modulus and/or phase of said transfer function.

In one embodiment the digital signal processing unit is adapted to adjust said transfer function such that it depends on frequency across the bandwidth of said channel.

This is particularly suitable for application to channels having a large bandwidth, for example where the bandwidth of the channel is of the same order of magnitude as the ADC sampling rate.

In one embodiment, the digital signal processing unit may comprise at least one programmable digital filter for adjusting said respective transfer function of at least one said channel.

This is useful in that the transfer function of the digital filter may be adjusted in order to accurately compensate a change in the transfer function of the RF filter, for example, by synthesizing the inverse transfer function of the RF filter or the inverse change in transfer function between different discrete settings of the RF filter.

The digital signal processing unit may be adapted to adjust said transfer function in dependence on a frequency associated with said channel.

This enables the adjustment of the transfer function of the respective channel to be optimized for each channel. The adjustment of the transfer function for a particular channel may take into account the change in transfer function of the RF filter at the specific frequency or range of frequencies of that channel.

In one embodiment, said digital signal processing unit is configured to process the digital signal to provide a plurality of channels at the output of the receiver; and said digital signal processing unit is configured to adjust respective transfer functions of said channels to at least partially compensate a change in the transfer function of the RF filter when the RF filter is reconfigured.

This allows the respective transfer function of each channel to be adjusted independently to optimize performance of the RF receiver.

The digital signal processing unit may comprise a plurality of digital filters for adjusting said respective transfer functions of said plurality of channels.

This approach may be suitable for multi-channel applications with small to medium channel bandwidth (i.e. a bandwidth much lower than the ADC sampling rate).

In one embodiment, the digital signal processing unit is configured to adjust the respective transfer function of at least one said channel by an amount which is constant across the bandwidth of said channel.

This approximation simplifies the DSPU operation and may be particularly suitable for applications in which a change in the transfer function of the RF filter has only a limited variation across the independent channel bandwidth.

In another embodiment the digital signal processing unit may comprise a plurality of digital down-converters corresponding to said plurality of respective channels, wherein a multiplier of at least one said digital down-converter is operated to adjust the transfer function of said respective channel.

The RF receiver may be adapted to determine a frequency spectrum relating to the RF signal and to reconfigure the RF filter when a change in said spectrum is detected.

This feature may be used to relax the requirement on dynamic range of the ADC, for example by monitoring the input RF signal spectrum and reconfiguring the RF filter as necessary to maintain a relatively flat signal amplitude distribution at the ADC input.

The RF filter may be reconfigurable between a plurality of discrete settings.

The RF receiver may comprise a memory for storing values for programming the RF filter with said settings.

The RF receiver may comprise a memory for storing values of the RF filter transfer function corresponding to said discrete settings. The memory may store values for said transfer function as a function of frequency, temperature and/or supply voltage.

The digital signal processing unit may be adapted to adjust a respective transfer function of at least one said channel between a plurality of discrete settings, corresponding to the plurality of discrete settings of the RF filter or to transitions between said plurality of discrete settings of the RF filter.

The RF receiver may comprise a memory for storing transfer function values relating to the discrete settings.

The RF receiver may be adapted to calculate a required adjustment of the transfer function of at least one channel based on a selected configuration of the RF filter.

The RF receiver may be a direct RF digitization receiver.

BRIEF DESCRIPTION OF THE DRAWINGS

A preferred embodiment of the present invention will now be described, by way of example only and not in any limitative sense, with reference to the accompanying drawings, in which:

FIG. 4 illustrates an RF receiver 2 according to an embodiment of the invention, in the form of a direct RF digitization receiver 2. The receiver 2 comprises an RF signal processing unit (RSPU) 10 for receiving an RF signal. The RSPU includes a low noise amplifier 12, a dynamically-reconfigurable RF filter 14 for filtering the RF signal output by the low noise amplifier 12, and further analog components 16 (typically a low noise amplifier, low pass filter, and single- to differential amplifier) for processing the signal output by the RF filter 14. The RSPU 10 also includes an I2C communications bus for communication with a host processor 20, which may be in the form of a System on Chip 20.

DETAILED DESCRIPTION

Figure 1:
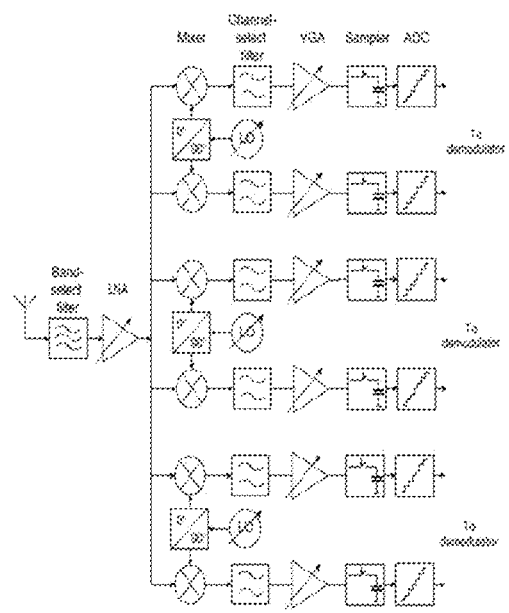
FIG. 1 shows a schematic representation of a single-channel receiver bank, useful for understanding the present invention.
Figure 2:
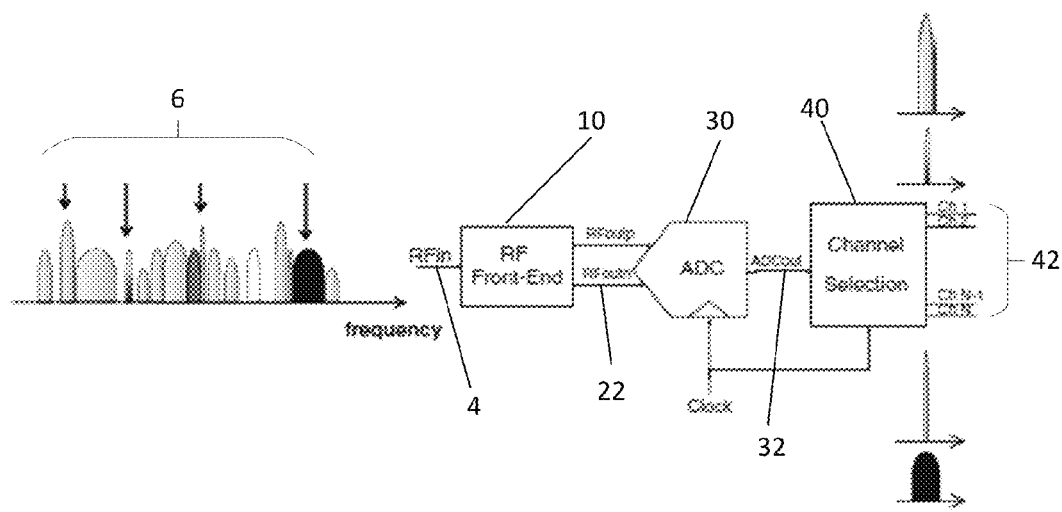
FIG. 2 shows a schematic representation of a direct RF digitization receiver.

The RF receiver 2 also comprises an analog-to-digital converter (ADC) 30 for converting the filtered RF signal 22 output by the RSPU 10 into a digital signal 32 and a digital signal processing unit (DSPU) 40 for processing the digital signal output by the ADC 30 to provide at least one channel 42. The DSPU 40 comprises a digital down-converter (DDC) 44 for each channel 42, and an I2C bus 46 for communicating with the host processor 20.

The DSPU 40 also includes circuitry 48 for performing spectral analysis of the digital signal 32. Spectral analysis of the digital signal 32 can provide information about the amplitude or power spectrum of the input RF signal 4.

We use the term 'RF filter' in a general sense to indicate any circuitry whose operation on the RF signal can be described by a transfer function varying with frequency. In the present embodiment, the RF filter 14 can be programmed to provide a transfer function adapted to compensate for an uneven amplitude distribution in the input RF signal, so that the filtered RF signal 22 input to the ADC 30 has a flatter spectrum. For example, the RF filter may be used to compensate for a positive or negative slope in the amplitude of the input RF signal across the bandwidth of the input signal 4. Reducing the amplitude variation of the input RF signal across the input bandwidth improves the overall performance of the RF receiver 2, by reducing the dynamic range required by the ADC 30 for a given input signal 4 amplitude distribution.

The RF filter 14 is dynamically-reconfigurable, that is, it can be reconfigured during operation. This enables the transfer function of the RF filter 14 to be adjusted in response to changes in the spectrum of the input signal 4. The RF signal spectrum can be measured continuously or periodically during operation of the receiver 2. When a significant change in the spectrum of the input signal 4 is identified, the RF filter 14 is reconfigured accordingly.

The RF filter 14 may have a plurality of discrete settings, the transfer functions for which are known, either by design, or from IC or board characterization, and stored in a memory, for example a ROM (not shown). This initial knowledge is completed by a measurement each time the system is powered up. For each RSPU filter setting, a few points at different frequencies are measured at systems start up, using the available cable signal. These two collections of information are combined and stored in a memory.

Figure 3:
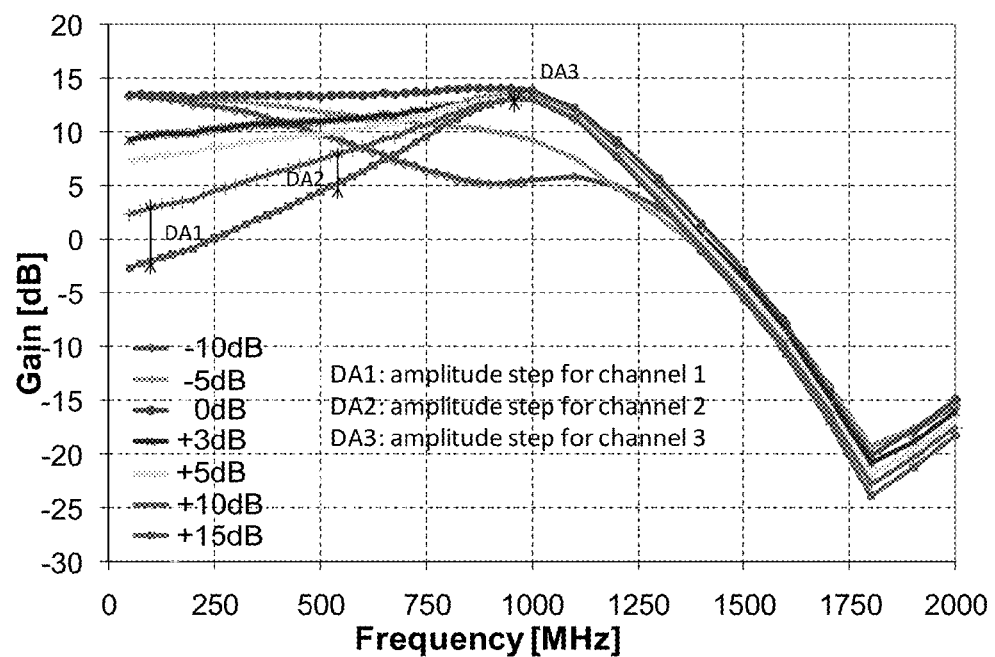
FIG. 3 illustrates example transfer functions of a reconfigurable programmable RF filter.

FIG. 3 shows example transfer functions corresponding to seven different discrete programmable settings for the RF filter 14. FIG. 3 shows only the modulus of the transfer function as a function of frequency, but it should be noted that the transfer function is generally a complex function having both modulus and phase.

The results of the spectral analysis are used to calculate the optimum setting of the RF filter 14 from the settings available. When a significant change in input spectrum is detected, the optimum setting is recalculated and the RF filter is reconfigured accordingly.

Using the example transfer functions shown in FIG. 3, at an instance when the RF filter 14 operates a transfer function transition from the "+15 dB" setting (corresponding to the lowermost transfer function at the left hand side of FIG. 3) to the "+10 dB" setting (corresponding to the second-to-lowermost transfer function at the left hand side of FIG. 3), there will be a jump in amplitude of the signal 22 output by the RSPU 10. Importantly this amplitude step will be different at different frequencies and therefore will be different for different channels 42 of the DSPU 40. FIG. 3 indicates the position of three example channel frequencies, and the corresponding amplitude steps: DA1, DA2 and DA3. It can be seen that the amplitude corresponding to the frequency of channel 1 changes by DA1=+5 dB, the amplitude at the frequency of channel 2 changes by DA2=+3 dB, and the amplitude at the frequency of channel 3 changes by DA3=0 dB (i.e. no change). These amplitude steps occur nearly instantaneously when the RF filter 14 is reconfigured between different settings. In a conventional RF receiver, the baseband demodulator of channel 3 would continue to operate without experiencing any significant perturbation, but the amplitude steps would cause the baseband demodulators of channels 1 and 2 to experience uncorrectable errors and even de-lock.

Figure 4:
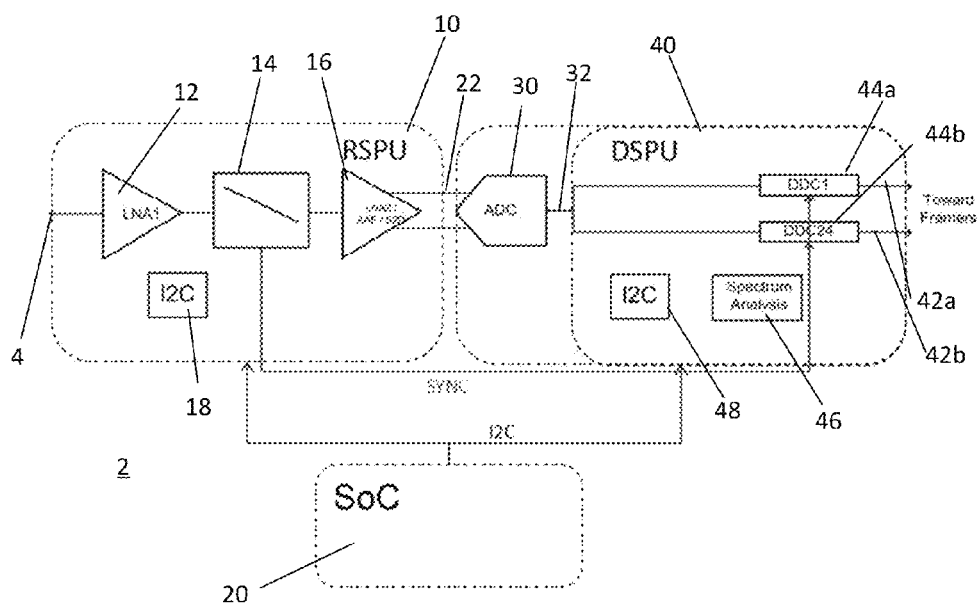
FIG. 4 illustrates an RF receiver according to an embodiment of the invention.

In the embodiment shown in FIG. 4, the DSPU 40 is adapted to adjust a respective gain or transfer function of the channels 42 when the RF filter 14 is reconfigured, to at least partially compensate the change in the transfer function of the RF filter 14. Using the stored details of the transfer functions of the RF filter 14 (or of the RSPU 10 as a whole), the receiver 2 is able to calculate the amplitude and/or phase step between the current and the future RSPU settings that will need to be cancelled per channel by the DSPU 40.

When operating the example change of settings described above, from the "+15 dB" setting to the "+10 dB" setting shown in FIG. 3, the multiplier of digital down-converter 44a (DDC1) of channel 1 operates a gain amplitude change of −5 dB, the multiplier of digital down-converter 44b (DDC2) of channel 2 operates a gain amplitude change of −3 dB, and the multiplier of digital down-converter 44c (DDC3) of channel 3 operates no gain amplitude change.

The RSPU 20 and DSPU 40 are pre-programmed so that they are ready to operate the required changes. The amplitude and/or phase changes of the RSPU 20 and DSPU 40 are synchronized using a SYNC signal which is programmable on both the RSPU 10 and DSPU 40. By triggering the new RSPU setting and synchronously operating the opposite change in the DSPU 40, the RSPU 10 can be reconfigured during operation of the receiver 2, for example in response to changes in the input signal spectrum, while avoiding or limiting any transient amplitude step at the baseband demodulator. This enables the receiver 2 to continue operating without significant error or interruption.

Following reconfiguration of the RF filter 14 of the RSPU 10, the gain of each individual DDC 44 in the DSPU 40 is incrementally brought back to zero using gain steps that are small enough to be transparent for the baseband demodulator, for example 0.1 dB for 256QAM. The overall effect is that, even when the RF filter 14 causes a step change in the amplitude and/or phase of the RF signal, the corresponding change in amplitude and/or phase of the digital channels 42 is gradual, and occurs sufficiently slowly that it can be followed by the baseband demodulators.

Figure 5:
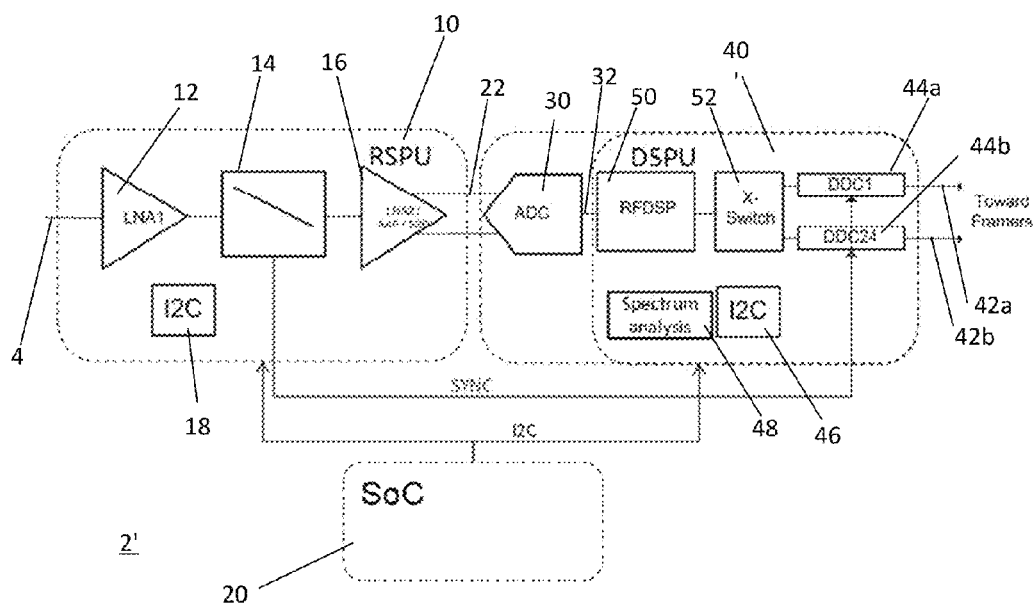
FIG. 5 illustrates an RF receiver according to another embodiment of the invention.

FIG. 5 shows a further embodiment of an RF receiver 2' according to the present invention. Elements already described in connection with the embodiment shown in FIG. 4 are indicated by the same reference numbers. The DSPU 40' further includes a band-splitter 50 and X-switch 52 for splitting the input signal band into several sub-bands, each of which is passed to a respective digital down-convert (DDC) 44. This arrangement optimizes digital down-conversion in cases in which the ADC 30 is operated at a high sampling rate. By splitting the ADC output into sub-bands, the sampling rate of the DDCs is reduced compared to the sampling rate of the ADC, thereby improving efficiency of the DDCs 44. Changes in the transfer function of the RF filter 14 may be compensated by means of dedicated filters (incorporated into the digital down-converters 44) on a channel-by-channel basis.

Figure 6:
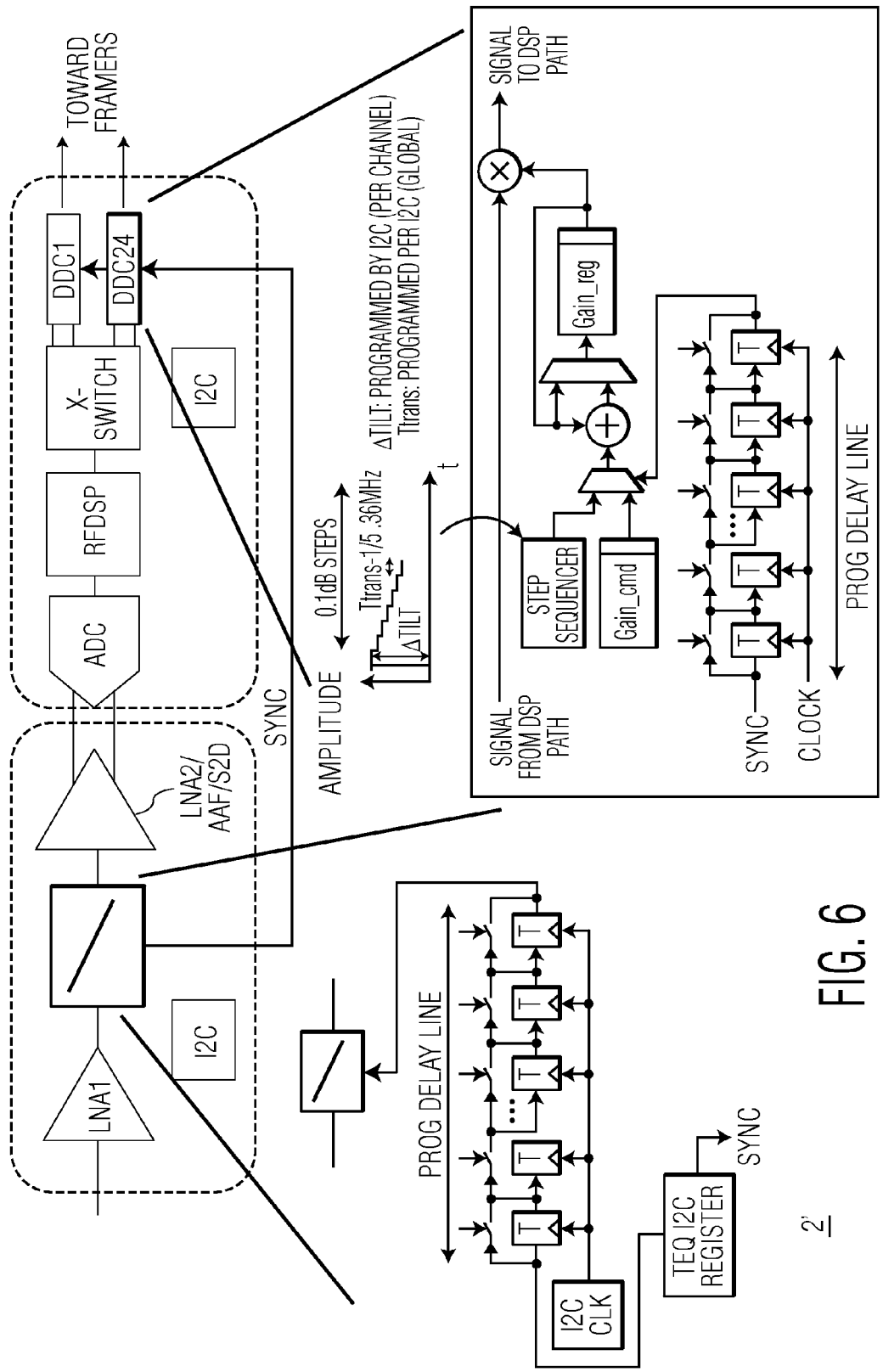
FIG. 6 illustrates an RF receiver according to a further embodiment of the present invention.

FIG. 6 shows further detail of the synchronization of the RF filter 14 in the RSPU 10 and the digital down-converters 44 in the DSPU 40'. As shown in the inset graph of FIG. 6, the change in gain amplitude with time of the individual DDCs 44 when the RF filter 14 is reconfigured is controlled by two parameters, $\Delta$Tilt and $T_{trans}$. The initial step change of the channel gain has an amplitude $\Delta$Tilt, which is programmed per channel via the I2C bus. The subsequent decrements (each of 0.1 dB in this example) returning the gain to its initial value have a duration $T_{trans}$ (e.g. $T_{trans}$=1/5.36 MHz) which is programmed globally via the I2C bus. These parameters are stored in a step sequencer and synchronized by a SYNC signal. The SYNC signal may be generated in the RSPU 10.

Figure 7:
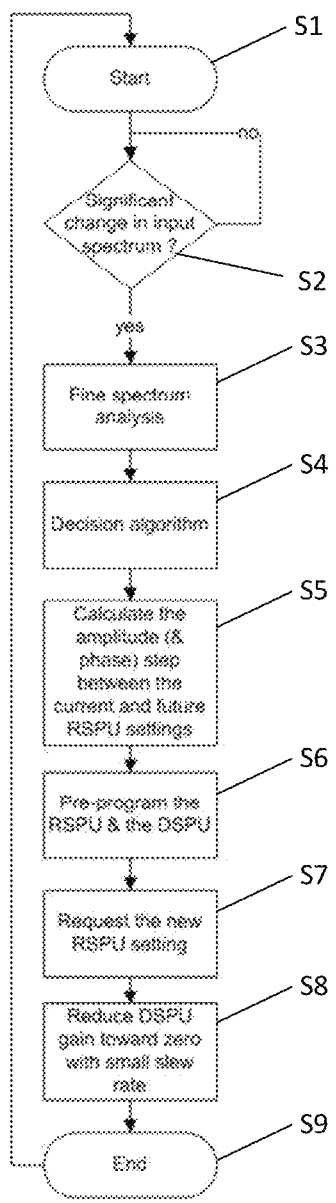
FIG. 7 is a flow chart illustrating a process executed by the RF receiver according to an embodiment of the invention.

FIG. 7 illustrates a process executed in the receiver 2 of the present embodiment. The process starts at step S1. At step S2, the receiver 2 determines whether there is a significant change in the spectrum of the input signal 4. This is carried out either by continuous measurement or by periodic measurements at suitable intervals. If there is no significant change in the input spectrum, the receiver continues to monitor the input spectrum.

If there is a significant change in the input spectrum the receiver 2 proceeds to step S3 and performs a more detailed spectral analysis of the input signal 4. This step provides detailed information about the input signal across its frequency range. For example, a table of power spectral density across frequency may be compiled.

The process then moves forward to step S4, at which a decision algorithm calculates the optimum setting for the RSPU 10, i.e. the optimum setting of the RF filter 14.

At step S5, the amplitude (and/or phase) step between the current and future RF filter settings is calculated. This may be calculated based on the difference of transfer functions between adjacent settings of the RF filter 14, which may be stored in memory. The transfer functions, or the differences between transfer functions corresponding to different settings of the RF filter 14, may be known partly by design or from IC/board characterization. In addition, the transfer functions may be measured each time the receiver 2 is powered up, by measuring a number of points in frequency for each RF filter setting using the available cable signal. These two sources of information may be combined and stored in a memory. This calculation determines the amplitude and/or phase step that will need to be cancelled per channel by the DSPU 40.

At step S6, the RSPU 10 and DSPU 40 are programmed so that they are ready to operate the required changes.

At step S7, the new RSPU setting is requested. This triggers reconfiguration of the RF filter 14 and synchronously operates the opposite change in the gain or transfer function in the DSPU 40.

At step S8, the DSPU gain is reduced towards zero at a small slew rate. This progressively returns the DSPU gain to zero, at a sufficiently low speed.

The process ends at step S9 and returns to the start step S1.

The change in the transfer function of the RF filter 14 which occurs when the RF filter 14 is reconfigured may be compensated in several different ways by the DSPU 40. In one embodiment, the DSPU 40 includes a programmable digital filter which, in essence, synthesizes the inverse transfer function of the RF filter 14, thereby cancelling the amplitude and phase change arising when the RF filter 14 is reconfigured between different discrete settings. This is suitable for applications that use large channel bandwidth, for example, where the bandwidth is on the same order of magnitude as the ADC sampling rate. The programmable digital filter can be used to adjust the transfer function of each channel by an amount which varies with frequency across the bandwidth of any individual channel.

In another embodiment, the DSPU 40 includes a programmable digital filter which is used to cancel the instantaneous amplitude and phase steps caused by switching of the RF filter transfer function from one setting to another. This is again useful, for example, in applications that use large channel bandwidths.

In another embodiment, the instantaneous amplitude (and/or phase) change caused by the reconfiguration of the RF filter 14 is cancelled, on a channel-by-channel basis, by a bank of narrow-band filters. This is more suitable for multichannel applications with small to medium channel bandwidth (e.g. bandwidth much lower than the ADC sampling rate). The change in transfer function or gain is calculated or selected independently for each channel.

In yet another embodiment, as described above, the instantaneous amplitude change caused by the reconfiguration of the RF filter 14 is cancelled, on a channel basis, by a bank of "gain step killers". In this case, the change in transfer function for each channel (a vectorial operation) is approximated by a scalar gain change. The transfer function or gain of each channel may be adjusted by an amount which is constant across the bandwidth of any given channel. This is particularly suitable for applications in which the RSPU transfer function change has limited variation across the band width of each individual channel. This approximation greatly simplifies the operation of the DSPU 40.

In the present embodiment, the RSPU is reconfigured whenever there is a significant change in the spectrum of the input signal 4, in order maintain a well-equalized RF signal 22 at the ADC input. In one embodiment spectral analysis is performed by the DSPU 40 on the digital signal 32 at the ADC output. This provides an indication of changes in the behavior of the input signal behavior, as well as indicating whether the filtered RF signal 22 at the ADC input is well-equalized. Conveniently, this approach also enables the spectral analysis to be carried out entirely in the digital domain. However, in other embodiments, it may be more useful to monitor the input RF signal 4 and to perform spectral analysis on the input RF signal 4.

The spectral analysis does not have to be fully integrated into the DSPU 40. For instance, the DSPU 40 could provide a time domain representation of the digitized signal, while the host processor 20 (e.g. SoC or FPGA) calculates a frequency domain representation (e.g. FFT or periodogram) of the signal.

In another embodiment, the spectral analysis is achieved by combining the results of power estimates provided by detectors in each of the DDCs 44 (although, only a part of these detectors can be used).

In another embodiment, the spectral analysis is achieved by an additional DDC or an additional single-channel tuner, which sequentially scans part or all of the input RF band.

In some embodiments, the DSPU 40 may operate a sub-band splitting at the ADC output (for example, as described in US 2010 0174768). In such embodiments, the power at the output (or at an intermediate output) of the sub-band splitting can be used for performing a coarse spectral analysis.

In some embodiments, a least-square error method is used for computing the optimum RF filter transfer function setting based on the result of the spectral analysis.

The receiver may include a memory for storing data relating to the RF filter transfer functions. These transfer functions may be stored during the IC or board production stage and may be obtained from calculation, simulation, measurement results, or calibration at system power-up. In the latter case, either a dedicated test signal or any available input signal may be used.

A non-volatile memory may be provided. In such cases, the database of stored measurements would increase each time the system is powered-up. The receiver 2 may also include an internal temperature and/or voltage supply sensor, and the memory could then include a full description of the RF filter transfer functions across frequency, temperature and/or supply voltage.

Although the RF receiver 2 of the present invention has been described in terms of a direct RF digitization receiver 2, the invention could also be implemented in a wideband IF section of an RF receiver. In this case, the RSPU would include a down-convertor or mixer.

Although the RF receiver 2 of the present invention has been described above in terms of a broadband receiver for implementing a multichannel receiver, it could also be used for receiving a single wide-band channel.

It will be appreciated by persons skilled in the art that the above embodiments have been described by way of example only, and not in any limitative sense, and that various alterations and modifications are possible without departure from the scope of the invention as defined by the appended claims.

The invention claimed is:
1. An RF receiver comprising:
an RF signal processing unit for receiving an RF signal, wherein the RF signal processing unit comprises a dynamically reconfigurable RF filter for filtering the RF signal;
an analog to digital converter for converting the filtered RF signal to a digital signal; and
a digital signal processing unit for processing the digital signal to provide at least one channel;
wherein the digital signal processing unit is adapted to adjust a respective transfer function of at least one said channel when the RF filter is reconfigured, to at least partially compensate a change in the transfer function of the RF filter; and a control part adapted to provide:
- a first control signal for triggering reconfiguration of the RF filter; and
- a second control signal, synchronized with said first control signal, for controlling said digital signal processing unit to adjust said respective transfer function of said at least one channel in response to the reconfiguration of the RF filter.

2. An RF receiver according to claim 1, wherein said digital signal processing unit is adapted to incrementally adjust the respective transfer function of said at least one channel to its previous value following reconfiguration of the RF filter.

3. An RF receiver according to claim 1, wherein said digital signal processing unit is configured to adjust the modulus or phase of said transfer function.

4. An RF receiver according to claim 1, wherein said digital signal processing unit is adapted to adjust said transfer function such that it depends on frequency across the bandwidth of said channel.

5. An RF receiver according to claim 1, wherein said digital signal processing unit comprises at least one programmable digital filter for adjusting said respective transfer function of at least one said channel.

6. An RF receiver according to claim 1, wherein said digital signal processing unit is adapted to adjust said transfer function in dependence on a frequency associated with said channel.

7. An RF receiver according to any of the preceding claims, wherein:
said digital signal processing unit is configured to process the digital signal to provide a plurality of channels at the output of the receiver; and
said digital signal processing unit is configured to adjust respective transfer functions of said channels to at least partially compensate a change in the transfer function of the RF filter when the RF filter is reconfigured.

8. An RF receiver according to claim 7, wherein said digital signal processing unit comprises a plurality of digital filters for adjusting said respective transfer functions of said plurality of channels.

9. An RF receiver according to claim 7, wherein said digital signal processing unit is configured to adjust the respective transfer function of at least one said channel by an amount which is constant across the bandwidth of said channel.

10. An RF receiver according to claim 7, wherein said digital signal processing unit comprises a plurality of digital down-converters corresponding to said plurality of respective channels, wherein a multiplier of at least one said digital down-converter is operated to adjust the transfer function of said respective channel.

11. An RF receiver according to claim 1, adapted to determine a frequency spectrum relating to the RF signal and to reconfigure the RF filter when a change in said spectrum is detected.

12. An RF receiver according to claim 1, wherein the RF filter is reconfigurable between a plurality of discrete settings.

13. An RF receiver according to claim 12, wherein the digital signal processing unit is adapted to adjust a respective transfer function of at least one said channel between a plurality of discrete settings, corresponding to the plurality of discrete settings of the RF filter or to transitions between said plurality of discrete settings of the RF filter.

14. RF receiver according to claim 1, wherein said RF receiver is a direct RF digitization receiver.

15. The RF receiver of claim 1:
wherein said digital signal processing unit is adapted to incrementally adjust the respective transfer function of said at least one channel toward its previous value following reconfiguration of the RF filter.

16. An RF receiver comprising:
an RF signal processing unit for receiving an RF signal, wherein the RF signal processing unit comprises a dynamically reconfigurable RF filter for filtering the RF signal;
an analog to digital converter for converting the filtered RF signal to a digital signal; and
a digital signal processing unit for processing the digital signal to provide at least one channel;
wherein the digital signal processing unit is adapted to adjust a respective transfer function of at least one said channel when the RF filter is reconfigured, to at least partially compensate a change in the transfer function of the RF filter; and
wherein said digital signal processing unit is adapted to incrementally adjust the respective transfer function of said at least one channel toward its previous value following reconfiguration of the RF filter.

17. The RF receiver of claim 16, further comprising:
a control part adapted to provide:
- a first control signal for triggering reconfiguration of the RF filter; and
- a second control signal, synchronized with said first control signal, for controlling said digital signal processing unit to adjust said respective transfer function of said at least one channel in response to the reconfiguration of the RF filter.

18. The RF receiver of claim 16, wherein:
said digital signal processing unit is configured to process the digital signal to provide a plurality of channels at the output of the receiver; and
said digital signal processing unit is configured to adjust respective transfer functions of said channels to at least partially compensate a change in the transfer function of the RF filter when the RF filter is reconfigured.

19. The RF receiver of claim 16:
wherein the RF receiver is adapted to determine a frequency spectrum relating to the RF signal and to reconfigure the RF filter when a change in said spectrum is detected.

* * * * *